United States Patent
Torok et al.

[11] 4,229,072
[45] Oct. 21, 1980

[54] COLOR DISPLAY SYSTEM USING MAGNETO-OPTIC SCREEN HAVING A DISPERSIVE FARADAY COEFFICIENT

[75] Inventors: Ernest J. Torok, Saint Paul; David L. Fleming, Edina; Thomas R. Johansen, Minneapolis, all of Minn.

[73] Assignee: Sperry Rand Corporation, New York, N.Y.

[21] Appl. No.: 913,259

[22] Filed: Jun. 6, 1978

[51] Int. Cl.³ .................. G02F 1/09; G11C 13/06; H04N 9/31; G11B 11/10
[52] U.S. Cl. .................. 350/151; 346/74.1; 358/61; 365/122
[58] Field of Search .................. 350/151; 365/2–3, 365/10, 122; 358/61, 232; 346/74.1; 340/146.3 B; 358/9, 127; 360/59, 57

[56] References Cited
U.S. PATENT DOCUMENTS

| | | | |
|---|---|---|---|
| 3,141,920 | 7/1964 | Bebb et al. | 365/122 |
| 3,612,759 | 10/1971 | Nelson et al. | 346/74.1 |
| 3,626,114 | 12/1971 | Lewicki et al. | 360/59 |
| 3,701,121 | 10/1972 | Fraser | 350/150 |

*Primary Examiner*—John K. Corbin
*Assistant Examiner*—Wm. H. Punter
*Attorney, Agent, or Firm*—Kenneth T. Grace; William E. Gleaver; Marshall M. Truex

[57] ABSTRACT

A display system using the dispersive Faraday coefficient of a magnetic screen to obtain a color display from white light is disclosed. A beam of energy is directed upon a magnetic screen while concurrently an intensity modulated magnetic field is directed normal to the surface of the magnetic screen. The combination of the heating effect of the energy beam and the magnetic orienting effect of the intensity modulated magnetic field established localized areas of differing magnetic characteristics over the planar surface of the magnetic screen. Subsequently, a polarized beam of white light that floods the magnetic screen is, for each of several wave lengths, differently rotated upon passing through each of the areas of differing magnetic characteristics in the magnetic screen. The beamlets that are formed by the so-differently rotated areas of the polarized white light beam are then passed through an uncrossed analyzer, which beamlets appear as a multicolored projection upon the magnetic screen.

3 Claims, 9 Drawing Figures

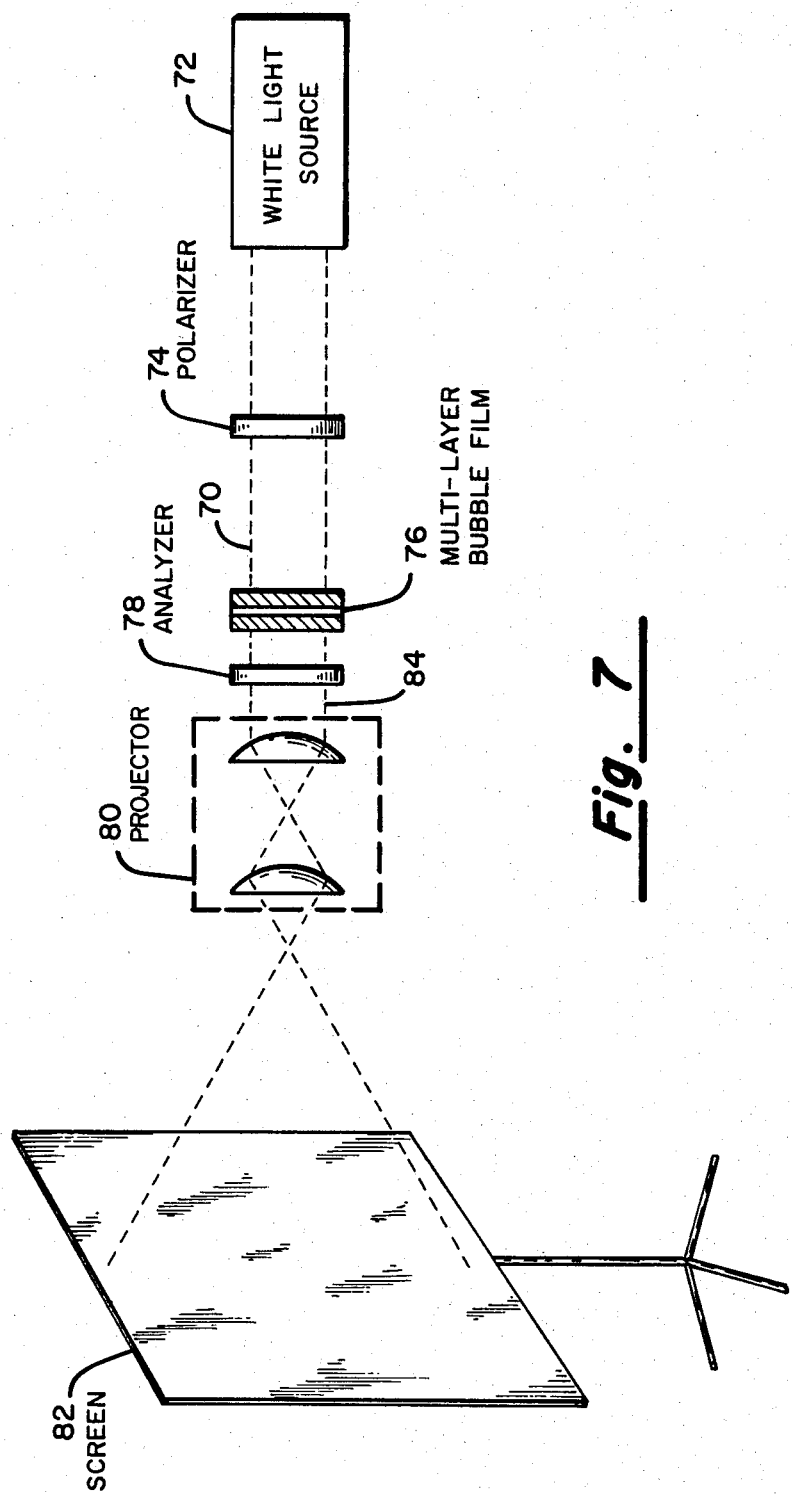

COLOR DISPLAY SYSTEM USING MAGNETO-OPTIC SCREEN HAVING A DISPERSIVE FARADAY COEFFICIENT

BACKGROUND OF THE INVENTION

Magneto-optic storage systems using the Faraday effect of a magnetizable thin film in combination with a polarizer/analyzer pair is well known in the art—see the R. C. Sherwood, et al, U.S. Pat. No. 3,059,538. In the publication "An Overview of Optical Data Storage," Di Chen, et al, Proceedings of the IEEE, Volume 63, No. 8, August, 1975, Pages 1207 through 1230, there is presented a review of various techniques for storing data information in optical storage devices. With particular reference to the present invention, the two techniques discussed therein are Curie point writing and compensation temperature writing. Curie point writing is a method in which the temperature rise in the heated spot of the magneto-optic storage device exceeds the Curie temperature of the storage medium. During cooling from the Curie temperature, the magnetic closure flux and the applied external field can effectively determine the direction of magnetization of the heated bit. Thin films of MnBi at room temperature and EuO at cryogenic temperatures have been most extensively studied along with many other materials proposed for the Curie point writing techniques.

Compensation temperature writing is a method using certain ferrimagnetic materials such as gadolinium iron garnet (GdIG), with two sublattice magnetizations in opposite directions. At the compensation temperature of the storage medium, these sublattice magnetizations cancel out each other and the storage medium attains extremely high coercivity $H_c$. A few degrees away from this compensation temperature the coercivity $H_c$ drops and magnetization switching becomes easy. By operating the storage medium at the compensation temperature, a switching field is applied in coincidence with a laser heating pulse, which allows the heated spot to rise above a temperature at which the coercivity is below the applied switching field. This method of writing has been experimentally demonstrated in single crystals and thin films of GdIG. A variation of this technique is based on the use of compensation wall domains in Ga-substituted YIG. Additionally, the use of the Faraday rotation of a plane polarized light beam that is incident to an iron garnet film has been studied for some years—see the publication "Faraday Rotation In Rare-Earth Iron Garnets," W. A. Crossley, et al, Journal of Applied Physics, Volume 40, No. 3, March 1, 1969, Pages 1497–1498.

Optical systems for the display of multi-colored displays have, in the past, utilized many techniques. Such systems have included systems for selectively orienting the crystal axis of a piezoelectric light valve to control the transmission of light of various wavelengths to achieve multi-colored displays—see the H. Jaffee U.S. Pat. No. 2,616,962, an electro-optic crystal controlled variable color modulator for producing multi-color images in TV receivers—see the T. F. Hanlon U.S. Pat. No. 3,428,743, and ferro-electric ceramic wafers for the switching of the three basic colors above the flicker fusion frequency in TV receivers—see the M. N. Ernstoff, et al, U.S. Pat. No. 3,783,184. Additionally, in the publication "3-Color Laser Beam and Acousto-Optic Cell Pave the Way for Practical Uses," E. Dilatush, EDN, July 5, 1974, Pages 16, 17, there is discussed an optical system wherein a single laser, which emits light of red, green and blue wave lengths, is fed through an acoustic-optic cell that is simultaneously driven by three modulating frequencies. By adjusting the three modulating frequencies, three of the beams, one of each color, can be made to come out of the acoustic-optic cell at the same angle. The final result is a single modulated three-colored collinear beam that can be deflected and, in turn, projected upon a display screen. The present invention is considered to be an improvement over these other known optical systems.

SUMMARY OF THE INVENTION

In the present invention, in using the, e.g., compensation temperature writing technique, localized areas of a magnetizable storage medium, e.g., a gadolinium-iron-garnet (GdIG) film, when simultaneously affected by a beam of energy, e.g., a $CO_2$ laser, and an orienting in-plane magnetic field, are selectively established into one of, e.g., four magnetization states. The four magnetization states are established in a predetermined relationship such that each of the four magnetization states will rotate, by the Faraday effect, the polarization angle of each of four colors within a plane polarized beam of white light different degrees. The plane polarized beam of white light is then directed incident to the storage medium whereby the four different magnetization states of the localized areas selectively rotate the plane of polarization of the associated areas of the plane polarized white light the four different associated angles. An analyzer, having its plane of polarization properly oriented, i.e., rotated, with respect to the plane of polarization of the incident white light beam, is then oriented between the storage medium and an observer. The observer sees the effect of each of the localized areas upon the plane polarized white light beam as presenting upon the analyzer a localized area of one of the four colors. The colors of the four-color display are thus spatially configured by the configuration of the four magnetizable states of the magnetic storage medium, as achieved by the compensation temperature writing technique.

BRIEF DESCRIPTION OF THE DRAWINGS

FIG. 7 is a diagrammatic illustration of a second embodiment of a multi-color optical display system incorporating the present invention.

DESCRIPTION OF THE PREFERRED EMBODIMENTS

Figure 1:
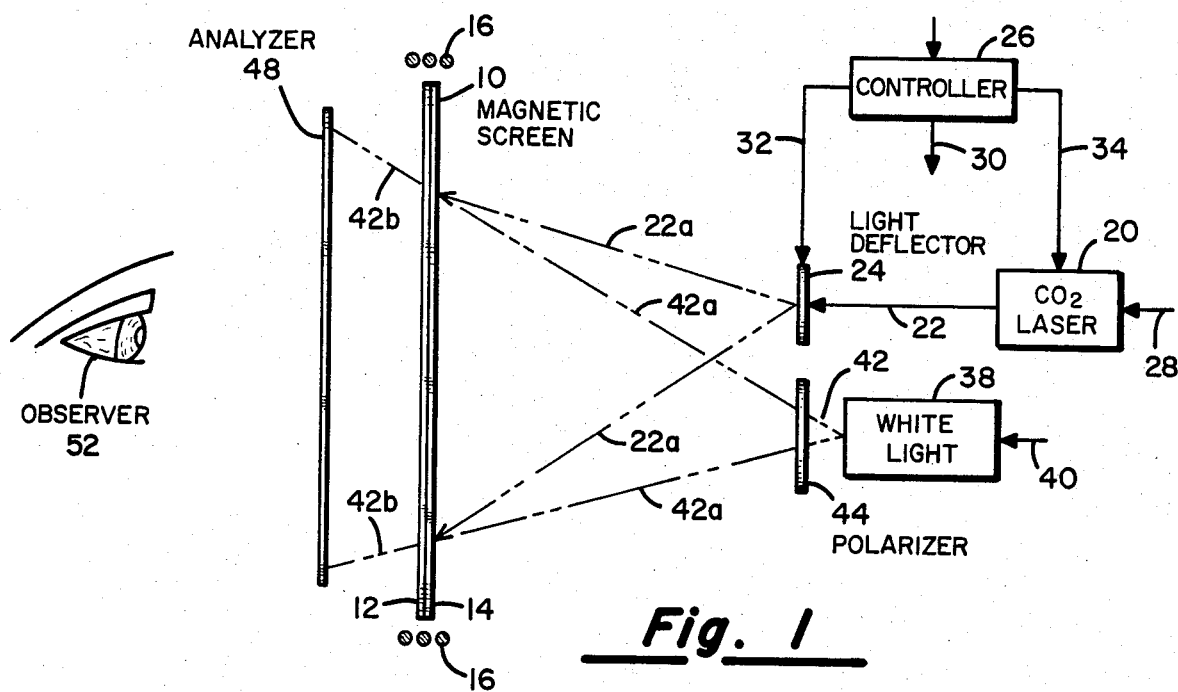
FIG. 1 is a diagrammatic illustration of a multi-color optical display system including a system utilizing the compensation temperature technique for the writing of the color discriminating information into a magnetic storage medium.

With particular reference to FIG. 1, there is presented a diagrammatic illustration of a first embodiment of the present invention utilizing the compensation temperature writing technique for establishing localized areas of a magnetizable storage medium into the desired magnetic states. The display system of FIG. 1 includes a magnetic screen 10 that may be comprised of a film of magnetic material of $RbFeF_3$ of approximately 1.0 millimeter (mm) in thickness. Around the periphery of the magnetic screen 10 there is provided a multi-turn coil 16 that when energized by a field $H_\perp$ source 18—see FIG. 2—couples to magnetic screen 10 a field $H_\perp$ that is directed orthogonally or perpendicular to the plane of magnetic screen 10, and accordingly, film 12. A $CO_2$ laser source 20 generates a coherent monochromatic light beam 22. Light beam 22 is directed normally incident upon light deflector 24, which may be of the same design as that of the E. J. Torok, et al, U.S. Pat. No. 3,752,563. Controller 26 causes deflector 24 to deflect beam 22 horizontally and vertically in a typical raster-scan sequence across the planar surface of magnetic screen 10 while, concurrently, $CO_2$ laser source 20 has coupled to an input terminal 28 an appropriate control signal causing beam 22 to be appropriately intensity modulated to write the desired information in magnetic screen 10.

The deflected beam 22a, which is caused to traverse film 12 in a typical raster-scan mode by deflector 24, is synchronized with the write control signal on line 28 and the write field $H_\perp$ that is provided by winding 16 as controlled by the write field $H_\perp$ signal on line 30. In a typical operation, the writing sequence is as follows:

A. Controller 26 couples a write red field $H_\perp$ control signal to field $H_\perp$ source 18 via line 30 whereby winding 16 couples to film 12 a write red field $H_\perp$ that is directed normal to the plane of film 12 and that is of the desired intensity to establish the affected localized areas of film 12 into a red transmitting magnetic state.

B. Controller 26 couples a timing signal to $CO_2$ laser source 20 via line 34 while, concurrently, a write red control signal is coupled to $CO_2$ laser source 20 via line 28, and a raster-scan control signal is coupled to deflector 24 via line 32.

C. The write red control signal of FIG. 3 triggers the beam 22a to be pulsed as it traverses the first line scan in the X direction, is directed downwardly in the Y direction one line scan width during the flyback sequence, and then is passed through N consecutive line scans until the two-dimensional planar surface of film 12 has been spatially subjected to the pulsed beam 22a as determined by the write red control signal on line 28 and the raster-scan control signal on line 32. All during the N line scans the write red field $H_\perp$ control signal has been continuously coupled to field $H_\perp$ source 18 via line 30. At the end of the N line scans of the write red sequence, the write red field $H_\perp$ is terminated, the beam 22 is terminated, and the film 12 is allowed to cool setting the magnetization of the affected localized areas of film 12 into the red transmitting magnetic state.

D. Controller 26 couples a write blue field $H_\perp$ control signal to field $H_\perp$ source 18 via line 30 whereby winding 16 couples to film 12 a write blue field $H_\perp$ that is directed normal to the plane of film 12 and that is of the desired intensity to establish the affected local areas of film 12 into a blue transmitting magnetic state.

E. Controller 26 couples a timing signal to $CO_2$ laser source 20 via line 34 while, concurrently, a write blue control signal is coupled to $CO_2$ laser source 20 via line 28 and a raster-scan control signal is coupled to deflector 24 via line 32.

F. The write blue control signal of FIG. 3 triggers the beam 22a to be pulsed as it traverses the first line scan in the X direction, is directed downwardly in the Y direction one line scan width during the flyback sequence, and then is passed through N consecutive line scans until the two-dimensional planar surface of film 12 has been spatially subjected to the pulsed beam 22a as determined by the write blue control signal on line 28 and the raster-scan control signal on line 32. All during these N line scans the write blue field $H_\perp$ control signal has been continuously coupled to field $H_\perp$ source 18 via line 30. At the end of the N line scans of the write blue sequence, the write blue field $H_\perp$ is terminated, the beam 22 is terminated, and the film 12 is allowed to cool setting the magnetization of the affected localized areas of film 12 into the blue transmitting magnetic state.

G. Controller 26 couples a write green field $H_\perp$ control signal to field $H_\perp$ source 18 via line 30 whereby winding 16 couples to film 12 a write green field $H_\perp$ that is directed normal to the plane of film 12 and that is of the desired intensity to establish the affected localized areas of film 12 into a green transmitting magnetic state.

H. Controller 26 couples a timing signal to $CO_2$ laser source 20 via line 34 while, concurrently, a write green control signal is coupled to $CO_2$ laser source 20 via line 28, and a raster-scan control signal is coupled to deflector 24 via line 32.

I. The write green control signal of FIG. 3 triggers the beam 22a to be pulsed as it traverses the first line scan in the X direction, is directed downwardly in the Y direction one line scan width during the flyback sequence, and then is passed through N consecutive line scans until the two-dimensional planar surface of film 12 has been spatially subjected to the pulsed beam 22a as determined by the write green control signal on line 28 and the raster-scan control signal on line 32. All during these N line scans, the write green field $H_\perp$ control signal has been continuously coupled to field $H_\perp$ source 18 via line 30. At the end of the N line scans of the write green sequence, the write green field $H_\perp$ is terminated, the beam 22 is terminated, and the film 12 is allowed to cool setting the magnetization of the affected localized areas of film 12 into the green transmitting magnetic state.

J. Controller 26 couples a write black field $H_\perp$ control signal to field $H_\perp$ source 18 via line 30 whereby winding 16 couples to film 12 a write black field $H_\perp$ that is directed normal to the plane of film 12 and that is of the desired intensity to establish the affected localized areas of film 12 into a black transmitting magnetic state.

K. Controller 26 couples a timing signal to $CO_2$ laser source 20 via line 34 while, concurrently, a write black control signal is coupled to $CO_2$ laser source 20 via line 28 and a raster-scan control signal is coupled to deflector 24 via line 32.

L. The write black control signal of FIG. 3 triggers the beam 22a to be pulsed as it traverses the first line scan in the X direction, is directed downwardly in the Y direction one line scan width during the flyback sequence, and then is passed through N consecutive line scans until the two-dimensional planar surface of film 12 has been spatially subjected to the pulsed beam 22a as determined by the write black control signal on line 28 and the raster-scan control signal on line 32. All during these N line scans, the write black field $H_\perp$ control signal has been continuously coupled to field $H_\perp$ source 18 via line 30. At the end of the N line scans of the write black sequence, the write black field $H_\perp$ is terminated, the beam 22 is terminated, and the film 12 is allowed to cool, setting the magnetization of the affected localized areas of film 12 into the black transmitting magnetic state. This completes the write operation whereby the affected localized areas of film 12 are written into their associated magnetic states representative of the associated red, blue, green or black transmitting states.

Figure 4:
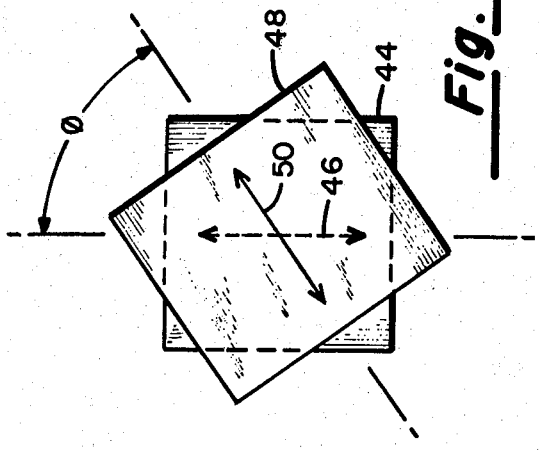
FIG. 4 is an illustration of the respective orientations of the planes of polarization of the incident white light beam upon the magnetic storage medium as determined by the polarizer of FIG. 1 and of the analyzer in selectively filtering the selectively rotated planes of polarization of the white light beam transmitted by the magnetic storage medium.

For the read or display operation, white light source 38, via a display control signal on line 40, emits a white light beam 42 that is incident upon polarizer 44. Polarizer 44 polarizes white light beam 42 in a, e.g., vertical plane represented by arrow 46 of FIG. 4. Plane polarized white light beam 42a then impinges upon magnetic screen 10 wherein each of the localized areas of film 12 rotates the plane of polarization of beam 42 in the uniquely associated manner forming beamlets, the polarization of each of which has been rotated in the manner representing the associated red, blue, green, black transmitting states as determined by the previous write sequence. These beamlets then impinge upon analyzer 48 which has its plane of polarization, as represented by arrow 50, rotated $\phi$ degrees out of alignment with the plane of polarization of polarizer 44 as represented by arrow 46—see FIG. 4. When $\phi = 90°$, analyzer 48 is said to be crossed with respect to polarizer 44. The observer 52 then observes upon analyzer 48 a multi-(four) color display whose spatial distribution of the four colors: red, blue, green, black, is as determined by the spatial distribution of the magnetic states of the localized areas of film 12.

With reference back to FIG. 2, there is shown a diagrammatic illustration of the recording of the four informational states of write red, write blue, write green, write black, each of which is represented by the uniquely associated vector length. The respective vector lengths are shown for the purpose of illustrating the concept of compensation temperature writing as utilized by the present invention. In this illustration, the magnetization $M_\parallel$, which is the vector representation of the magnetization in the localized areas of film 12 that is the normalized component of magnetization that is parallel to the light beam path, is schematically illustrated as being of the respective lengths 1, ½, ¼, 0 for the four color transmitting magnetic states red, green, blue, black of film 12. This schematic illustration is presented to illustrate the spatial distribution of the patterns forming groups of each of the four color transmitting magnetic states that may be achieved by the magneto-optic system of FIG. 1.

THEORY OF OPERATION

Faraday Effect and High Efficiency Magnetic Materials

Figure 5:
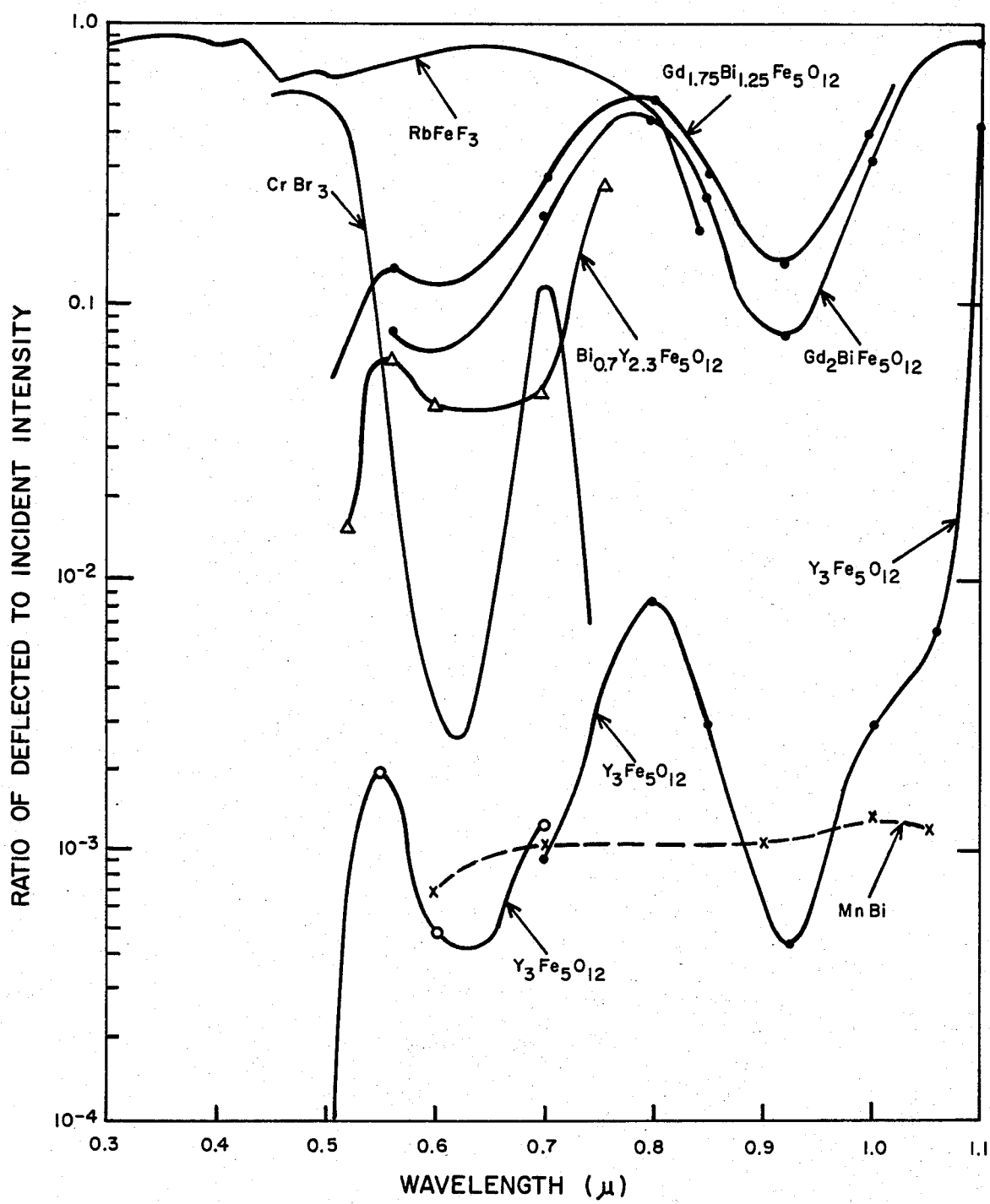
FIG. 5 is a plot of the ratio of deflected to incident intensity of an incident light beam for magnetic storage media of various materials.

When a polarized light beam passes through a magnetic material, the plane of polarization is rotated. The amount of rotation, $\theta$, is given by the product of the thickness, T, of the material, the Faraday coefficient, F, and the normalized component of magnetization parallel to the light path, $M_\parallel/M_0$:

$$\theta = FTM_\parallel/M_0 \tag{1}$$

when such a magnetic material is placed between nearly crossed polarizers, i.e., a polarizer and an analyzer, magnetic domains can be seen through the analyzer. In ordinary magnetic materials with small Faraday coefficients, the magnetic domains appear as contrasting light and dark shades of grey. However, there are high efficiency materials having large ratios of Faraday rotation to absorption. These materials can be used to make high efficiency displays, modulators, and deflectors. This is illustrated in FIG. 5 for various materials. In particular, the material $RbFeF_3$ has almost complete efficiency over the whole visible range. The high efficiency makes possible devices and applications that are impractical with older materials such as Permalloy, which has an efficiency of only one thousandth of one percent (0.001%). As research goes on, and these materials are improved and new ones discovered, these devices become more attractive.

Color from Faraday Rotation

Figure 6:
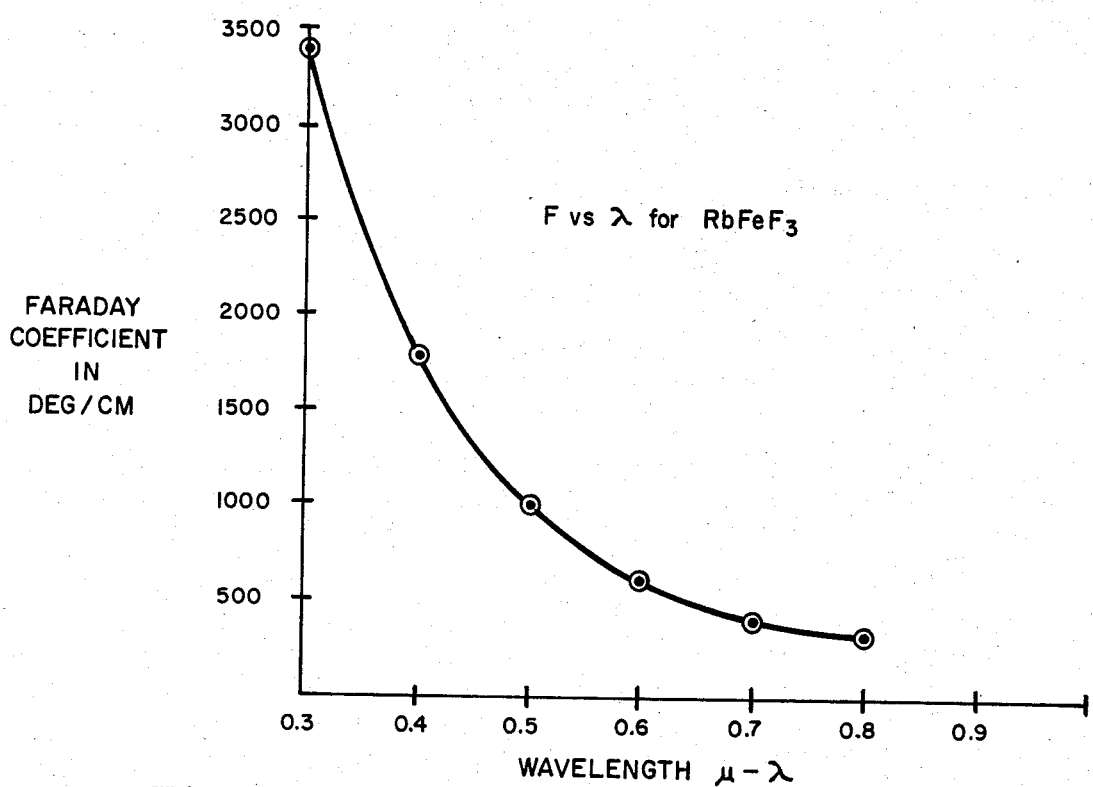
FIG. 6 is a plot of Faraday coefficient vs. wave length of the incident light beam for a magnetic storage medium of $RbFeF_3$.

When magnetic domains in a bismuth substituted iron garnet (a high efficiency Faraday material) are examined in a polarizing microscope, some of the magnetic domains are yellow, some are green, some are red and some are black. The colors could be shifted by rotating the analyzer. An explanation of how Faraday rotation can produce colors from a beam of white light is as follows. FIG. 6 shows the Faraday rotation of a magnetic film of $RbFeF_3$ in degrees per cm as a function of the wavelength of the light, $\lambda$. The longer wavelengths have a smaller Faraday coefficient than the shorter wavelengths. This dispersion, i.e., the difference in Faraday coefficients as a function of wavelength, is typical of magnetic materials. In some magnetic materials, the Faraday coefficient even changes sign as the wavelength changes. Because of this dispersion, the polarization angles of the different wavelength light beams as they emerge from the magnetic material are different. Some wavelengths will have a polarization angle that will not permit passage through the analyzer; these wavelengths are subtracted from the light emerging from the analyzer, thus changing white light into colored light.

Now according to equation 1, the polarization rotation $\theta$ is proportional to the component of magnetization normal to the film plane, $M_\parallel$. By increasing $M_\parallel$ one increases the magnitude of polarization rotation for all wavelengths. However, since the Faraday coefficient, F, is wavelength dependent, the rate of increase of polarization rotation is different for different wavelengths. At one value of $M_\parallel$ the rotations will be such that only green light passes through the analyzer; at another value of $M_\parallel$ only blue light will pass through the analyzer; at a third value of $M_\parallel$ only red light will pass through the analyzer, and at a fourth value of $M_{\parallel}$, no light at all will pass through the analyzer. In this way, different regions of the magnetic material with different values of $M_{\parallel}$ will appear as different colors. Likewise, if a means of writing those different values of $M_{\parallel}$ into desired regions of the film is incorporated, a four-color display can be made.

$$A = A_0 \cos \theta \tag{2}$$

and the intensity is the square of the amplitude $$I = I_0 \cos^2 \theta. \tag{3}$$

When equation 3 is combined with equation 1 the result is $$I(\lambda) = I_O(\lambda) \cos^2 F(\lambda) T M_{\parallel}/M_0. \tag{4}$$

EXAMPLE 1

Consider three wavelengths, $\lambda_1$, $\lambda_2$ and $\lambda_3$ corresponding to red, green, and blue. Let the Faraday coefficients be $F_1$, $F_2$ and $F_3$, respectively, and let $F_2$ be twice $F_1$ and $F_3$ be four times $F_1$. Let the thickness T of the film be chosen so that $F_1 T = 90°$. Let the plane of polarization of the analyzer be oriented $\phi = 67.5°$ from the plane of polarization of the polarizer, i.e., 22.5° away from extinction—see FIG. 4.

COLOR #1; BLACK

When the film is magnetized in the film plane, $M_{\parallel} = 0$. In this case the plane of polarization of the light is not rotated. If the intensity of light entering the analyzer is $I_O$ for each wavelength, the light emerging from the analyzer is $0.14 I_O$ for all three wavelengths.

COLOR #2; BLUE

When the film is magnetized so that $M_{\parallel} = \frac{1}{4} M_O$, the blue light is rotated 90°, the green light is rotated 45°, and the blue light is rotated 22.5°. The intensity of blue light emerging from the analyzer is $I_B = 0.86 I_O$, the intensity of green light is $I_G = 0.14 I_O$, and the intensity of red light is $I_R = 0$.

COLOR #3; GREEN

When the film is magnetized so that $M_{\parallel} = \frac{1}{2} M_O$, the blue light is rotated 180°, the green light is rotated 90°, and the red light is rotated 45°. The intensity of blue light emerging from the analyzer is $I_B = 0.14 I_O$, the intensity of green light is $I_G = 0.86 I_O$, and the intensity of red light is $I_R = 0.14 I_O$.

COLOR #4; RED

When the film is magnetized so that $M_{\parallel} = M_O$, the blue light is rotated 360°, the green light is rotated 180° and the red light is rotated 90°. The intensity of blue light emerging from the analyzer is $I_B = 0.14 I_O$, the intensity of green light is $I_G = 0.14 I_O$, and the intensity of red light is $I_R = 0.86 I_O$.

EXAMPLE 2

Let the analyzer be oriented $\phi = 60°$ from the plane of polarization of the polarizer. Let three wavelengths, $\lambda_1$, $\lambda_2$ and $\lambda_3$ (red, green and blue) be chosen such that their corresponding Faraday coefficients are in the ratio of 5:11:17, i.e., $F_3 = 3.4 F_1$ and $F_2 = 2.2 F_1$. Let the thickness of the film be chosen so that $F_1 T = 150$.

COLOR #1 BLACK

When the film is saturated so that $M_\lambda = M_O$, $\lambda_1$ is rotated 330°, and $\lambda_3$ is rotated 510°. Since the plane of polarization of the analyzer is rotated 60° from the plane of polarization of the polarizer, and since $150° - 60° = 90°$, $330° - 60° = 270° = 3(90°)$, and $510° - 60° = 450° = 5(90°)$, all three wavelengths $\lambda_1$, $\lambda_2$, $\lambda_3$ are completely extinguished.

COLOR #2; BLUE

When the film is magnetized so that $M_{\parallel} = -0.1889 M_O$ (the minus means in the opposite direction from color #1), $\lambda_1$ is rotated $-28.33°$, $\lambda_2$ is rotated $-62.30°$ and $\lambda_3$ is rotated $-96.33°$. The intensity of red light emerging from the analyzer is $0.008 I_O$; the intensity of green light emerging from the analyzer is $-0.286 I_O$, and the intensity of blue light emerging from the analyzer is $0.839 I_O$.

COLOR #3; GREEN

The film is magnetized so that $M_{\parallel} = -0.32 M_O$. The rotation of the three wavelengths are: $\lambda_1$ is rotated $-48°$, $\lambda_2$ is rotated $-105.6°$, and $\lambda_3$ is rotated $-181.3°$, respectively. The intensity of red light emerging from the analyzer is $I_1 = 0.242 I_O$, the intensity of green light emerging from the analyzer is $I_2 = 0.938 I_O$, and the intensity of blue light emerging from the analyzer is $I_3 = 0.23 I_O$.

COLOR #4; RED

The film is magnetized so that $M_{\parallel} = -0.75 M_O$. The rotations of the three wavelengths are: $\lambda_1$ is rotated 106.5°, $\lambda_2$ is rotated $-234.3°$ and $\lambda_3$ is rotated $-362.1°$, respectively. The intensity of red light emerging from the analyzer is $I_1 = 0.945 I_O$, the intensity of green light emerging from the analyzer is $I_2 = 0.169 I_O$, and the intensity of blue light emerging from the analyzer is $I_3 = 0.219 I_O$.

The two examples given above are only two of many possible. For example, one could have selected $M_{\parallel} = 0.36 M_O$ for the red color in Example 2, and $M_{\parallel} = 0.19 M_O$ for the black color at a small sacrifice in quality. Thus, a wide range of dispersion properties is acceptable. Use of colors corresponding to the above values would allow the use of a crystal, i.e., magnetic film 12, only 40% as thick as that required for Example 2, and allow use of a more absorptive material.

Figure 8:
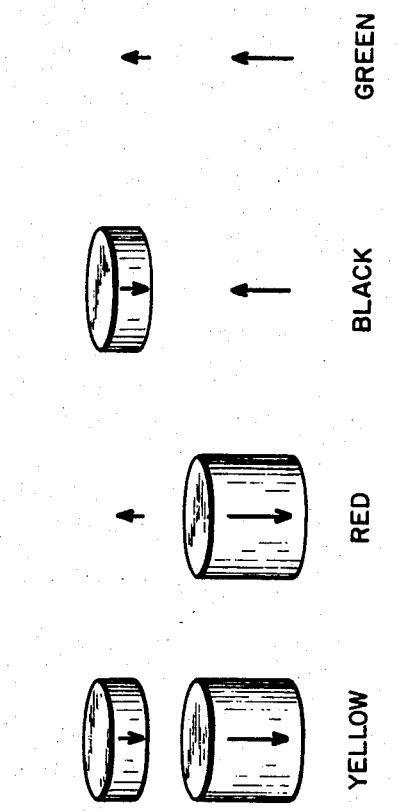
FIG. 8 is a diagrammatic illustration of the differing magnetic information states of the localized areas in the magnetic storage medium of FIG. 7.

A second embodiment of a four-color magneto-optic display system is a projection display that uses movable magnetic bubble domains instead of thermo-magnetic writing. In this second embodiment of FIG. 7, polarized light beam 70 from white light source 72 and polarizer 74 is shined through a multi-layer magnetic bubble domain memory plane 76 containing two magnetic film layers separated by a non-magnetic film layer. Polarized light beam 70 passes through an uncrossed analyzer 78 and a projection system 80 that projects an image of the memory plane 76 on a screen 82. Memory plane 76 is capable of supporting magnetic bubble domains in both magnetic film layers. The bubbles may exist in either layer independently and may also exist one over another, as shown in FIG. 8. The magnetic film layers are of different thicknesses so that the polarized light passing through a location, or localized area as defined by the bubble, can have its polarizing angle rotated four different values depending on the bubble states, i.e., the existence vel non of the bubbles, at that location. After the polarized white light beam that passes through a given location has passed through the analyzer 78, each of the beamlets that are included in light beam 84 is either green, black, red or yellow, depending on the bubble states at that location.

The advantage of using bubbles is that they can be propagated in serial fashion from location to location in memory plane 76. A well-known chevron track may be configured for providing a bubble raster (pattern) for a display system. Bubbles are written into memory plane 76 with a bubble generator at one corner location of the chevron track. This generator writes any one of the bubble combinations shown in FIG. 8, as in the B. J. Lin Pat. No. 3,965,299. Then the chevron track, along with the proper drive fields, propagates the bubble(s) to the next chevron, along the raster as defined by the chevron track, and a new bubble(s) is written at the write station. The chevron then moves each bubble to the next chevron, and a third bubble is written. In this fashion the whole raster is filled. An annihilator is provided at the end of the raster to dispose of unwanted bubbles when a new set of bubbles is written into the raster. The chevrons (or other propagating elements), can be ion etched, rather than Permalloy, to increase the optical efficiency of memory plane 76. Further, the bubble diameter can be increased by reducing the normal beam field.

Figure 9:
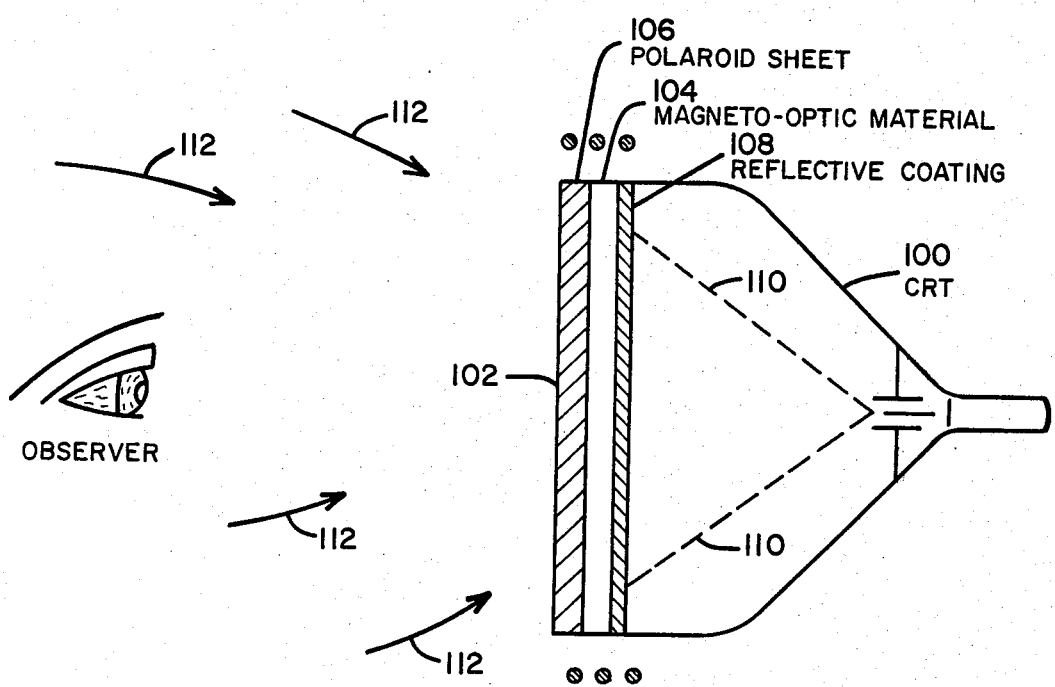
FIG. 9 is a diagrammatic illustration of a third embodiment of a multi-color optical display system incorporating the present invention.

A third embodiment of a four-color magneto-optic display system using ambient (natural) light as the white light source is illustrated in FIG. 9. In this embodiment, a conventional cathode ray tube (CRT) 100 is sealed at the picture end by a magnetic screen 102. Magnetic screen 102 is comprised of the integral assembly of a film 104 of magnetic material of, e.g., RfFeF$_3$ of approximately 1.0 mm in thickness, a polarizer 106 and a reflective coating or film 108 of, e.g., aluminum (Al) of, e.g., approximately 500 angstroms (Å). The electron beam 110 is utilized to write the desired informational states into the localized areas of film 104 by localized heating and thermal conduction. The aluminum film 108 is reflective to the white light 112 that is preferably room ambient light.

Figure 2:
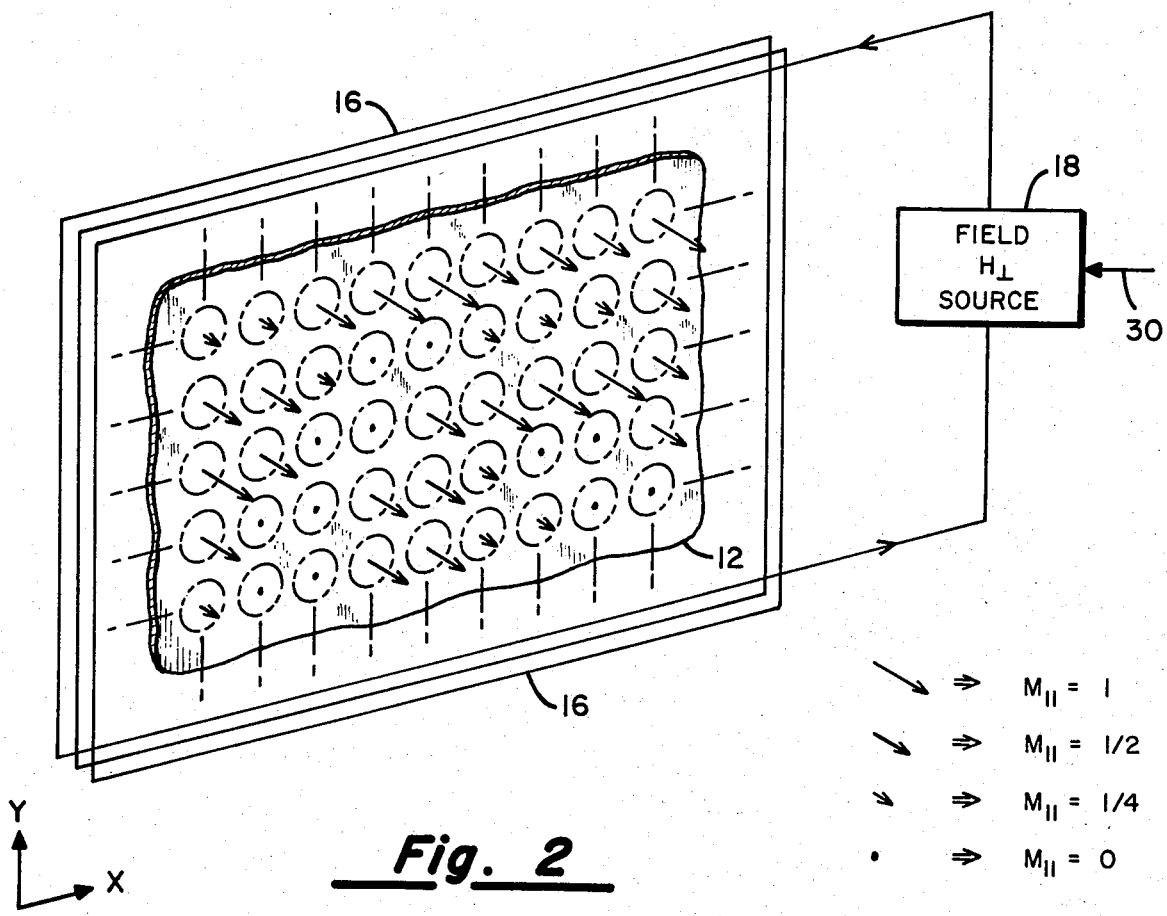
FIG. 2 is a diagrammatic illustration of the differing magnetic information states of the localized areas in the magnetic storage medium of FIG. 1.
Figure 3:
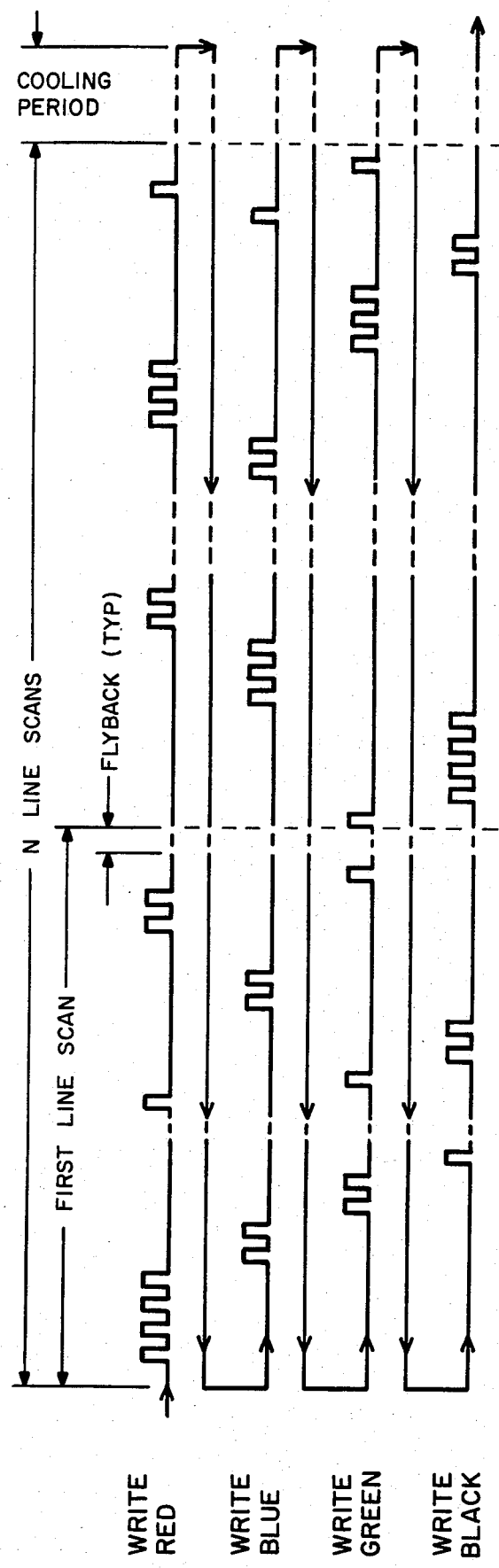
FIG. 3 is an illustration of an exemplary signal waveform utilized to write the four color magnetic information states into the localized areas of the magnetic storage medium of FIG. 2.

In this embodiment, the localized areas of film 104 are set into the four-color informational states in a manner similar to that discussed with respect to the embodiment of FIGS. 1, 2 and 3. However, in the embodiment of FIG. 9, polarizer 106 performs the function of both polarizer 44 and analyzer 48 of FIG. 1 such that the four colors are, on magnetic screen 102, spatially distributed in conformance with the spatial distribution of the four-color informational states of the localized areas of film 104.

In the embodiment of FIG. 9, the rear surface of the magneto-optic film 104 is covered by an Al reflective layer 108 and the front surface is covered by a single Polaroid sheet 106 which serves both as polarizer and analyzer. Light 112 from the room enters through the Polaroid sheet 106, and is thereby polarized. As the light passes through the magneto-optic material, the direction of polarization becomes rotated. The light is reflected from the reflective coating 108 and passes once again through the magneto-optic material where the direction of polarization is rotated once again in the same direction as before. The light then passes through the Polaroid sheet 106 and the portion that gets through the Polaroid sheet 106 goes into the eyes of the observers. If the total rotation of a particular wavelength $\lambda$ of light is 0° or an integral multiple of 180°, all light of that wavelength gets through. If the rotation of a particular wavelength is 90° or an odd multiple thereof, no light of that wavelength gets through. Since the magneto-optic material has a dispersive Faraday coefficient (i.e., the coefficient F varies with the wavelength of light as in FIG. 6), some wavelengths will be transmitted through the analyzer and some will be absorbed by the analyzer. This changes the white light to colored light. When the magnetic state of the magneto-optic material is changed, the color is also changed as explained in the preceding section.

COLOR FROM FARADAY ROTATION

As previously discussed above with respect to Examples 1 and 2, the amplitude of light of a given wavelength $\lambda$ having the polarization angle $\theta$ with respect to the analyzer from which it emerges is $$A = A_0 \cos \theta \tag{2}$$

and the intensity is the square of the amplitude $$I = I_0 \cos^2 \theta. \tag{3}$$

When Equation 3 is combined with Equation 1 the result is $$I(\lambda) = I_0(\lambda) \cos^2[2F(\lambda)TM_{\parallel}/M_0]. \tag{5}$$

EXAMPLE 3

Consider ambient light composed of three wavelengths $\lambda_1$, $\lambda_2$, $\lambda_3$ corresponding to red, green and blue. Let the magneto-optic material be such that the Faraday coefficient $F_2$ at the green wavelength be three times larger than the Faraday coefficient $F_1$ at the red wavelength and the Faraday coefficient $F_3$ at the blue wavelength be five times larger than the Faraday coefficient $F_1$ at the red wavelength. Choose the thickness T of the magneto-optic material so that when saturated in the normal direction the total Faraday rotation of the red wavelength $\lambda_1$ is $\theta = 90°$.

COLOR #1; BLACK

Saturate the magneto-optic material in the normal direction so that $M_{\parallel} = M_0$. Then $2F_1T = 90°$, $2F_2T = 270°$ and $2F_3T = 450°$. All these Faraday rotations are odd multiples of 90° and by Equation 5 the intensity of each emerging wavelength $\lambda_1$, $\lambda_2$ and $\lambda_3$ is zero. Accordingly, the displayed color is black.

COLOR #2; BLUE

Let the magnetic state of the magneto-optic material be such that $M_{\parallel} = 0.9 M_0$. Then $2F_1T = 81°$, $2F_2T = 243°$ and $2F_2T = 405°$ and the corresponding intensities from Equation 5 are $I_1 = 0.025 I_0$, $I_2 = 0.206 I_0$ and $I_3 = 0.50 I_0$.

COLOR #3; GREEN

Let the magnetic state of the magneto-optic material be such that $M_{\parallel} = 0.667 M_0$. Then $2F_1T = 60°$, $2F_2T = 180°$ and $2F_3T = 300°$ and the corresponding intensities from Equation 5 are $I_1 = 0.25 I_0$, $I_2 = 1.00 I_0$ and $I_3 = 0.25 I_0$.

COLOR #4; RED

Let the magnetic state of the magneto-optic material be such that $M_{\parallel} = 0.2444 M_0$. Then $2F_1T = 22°$, $2F_2T = 66°$ and $2F_3T = 110°$ and the corresponding intensities from Equation 5 are $I_1=0.86\, I_0$, $I_2=0.165\, I_0$ and $I_3=0.117\, I_0$.

What is claimed is:

1. A multicolor display system, comprising:
   magneto-optic means including magnetic means having a plurality of separate localized areas, each of which localized areas is capable of having a different associated Faraday coefficient for light of each of four different associated wavelengths said magnetic means comprising;
   a multilayer magnetic bubble domain memory plane formed of first and second magnetic film layers separated by and affixed to a non-magnetic layer; and
   said localized areas of each of said four patterns are formed of no or one or two magnetic bubble domains in none or one or both of said first and second magnetic film layers, respectively;
   means for generating a multiwavelength light beam;
   polarizer means for polarizing said multiwavelength light beam along a plane polarization axis;
   analyzer means having a plane polarization axis that is rotated with respect to the crossed orientation to the plane polarization axis of said polarizer means;
   means establishing groups of said localized areas of said magnetic means into four patterns, the localized areas of each of said four patterns having the same Faraday coefficient but the Faraday coefficient of the localized areas of said four patterns being different, with each of said different Faraday coefficients associated with a separate different one of said four different wavelengths; and
   display means, including said analyzer means, for simultaneously displaying said four patterns as four different color patterns and simultaneously providing a four color display.

2. A multicolor display system, comprising:
   a magnetic film having a plurality of separate localized areas, each of which localized areas has four different Faraday coefficients for light of each of four different associated wavelengths;
   polarizer means affixed to a first surface of said magnetic film;
   reflective means affixed to the second surface of said magnetic film;
   means establishing groups of said localized areas of said magnetic film into at least four patterns, the localized areas of each of said four patterns having the same Faraday coefficient but the Faraday coefficient of the localized areas of said four patterns being different, with each of said different Faraday coefficients associated with a separate different one of said four different wavelengths;
   ambient white light directed upon said multicolor display system, said polarizer means polarizing said ambient white light along a plane polarization axis;
   said magnetic film passing said ambient white light for forming beamlets of at least four different patterns of beamlets from said ambient white light, each of said different patterns of beamlets formed of beamlets of light of an associated wavelength that is of a substantially similarly rotated polarization;
   said reflective means reflecting the beamlets of said four different patterns of beamlets back through the associated patterns of Faraday coefficients of said magnetic film and onto said polarizer means for twice rotating the polarization of said four different patterns of beamlets;
   said polarizer means simultaneously passing said four different patterns of beamlets as a multicolor display of beamlets of said four different wavelengths.

3. A multicolor display system, comprising:
   magnetic means;
   polarizer means oriented on a first side of said magnetic means;
   reflective means oriented on the second side of said magnetic means;
   means establishing groups of localized areas of said magnetic means into at least four patterns, the localized areas of each of said four patterns having the same Faraday coefficient but the Faraday coefficient of the localized areas of said four patterns being different, with each of said different Faraday coefficients associated with a separate different one of four different light wavelengths;
   ambient white light directed upon said multicolor display system, said polarizer means polarizing said ambient white light along a plane polarization axis;
   each of said four patterns of Faraday coefficients associated with an associated different light wavelength of said ambient white light for forming beamlets of at least four different patterns of beamlets from said ambient white light, the beamlets of each of said four different patterns of beamlets having substantially similarly rotated plane polarization axes but the plane polarization axes of the beamlets of said four different patterns of beamlets being differently rotated;
   said reflective means reflecting the beamlets of said four different patterns of beamlets back through the associated patterns of Faraday coefficients of said magnetic means and onto said polarizer means whereby said polarizer means twice rotates the plane polarization axes of said four different patterns of beamlets;
   said polarizer means simultaneously passing said four different patterns of beamlets as a multicolor display of beamlets of said four different light wavelengths.

* * * * *